United States Patent
Girolamo et al.

(10) Patent No.: US 11,231,008 B2
(45) Date of Patent: Jan. 25, 2022

(54) PULTRUDED FIBROUS COMPOSITE STRIPS HAVING CORRUGATED PROFILES FOR WIND TURBINE BLADE SPAR CAPS

(71) Applicant: SIEMENS GAMESA RENEWABLE ENERGY A/S, Brande (DK)

(72) Inventors: Donato Girolamo, Molinara (IT); Jens Jørgen Østergaard Kristensen, Nørresundby (DK); Michael Noerlem, Svenstrup (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/218,631

(22) Filed: Dec. 13, 2018

(65) Prior Publication Data
US 2019/0195190 A1 Jun. 27, 2019

(30) Foreign Application Priority Data
Dec. 22, 2017 (EP) .................................... 17210037

(51) Int. Cl.
*F03D 1/06* (2006.01)
*B29D 99/00* (2010.01)
(Continued)

(52) U.S. Cl.
CPC ............ *F03D 1/0675* (2013.01); *B29C 70/52* (2013.01); *B29D 99/0028* (2013.01);
(Continued)

(58) Field of Classification Search
CPC .............. F03D 1/0675; F05B 2250/611; F05B 2250/61; F05B 2250/184; F05B 2230/20;
(Continued)

(56) References Cited

U.S. PATENT DOCUMENTS 8,226,866 B2 * 7/2012 Arelt ..................... B29C 70/545
264/136
8,356,982 B2 * 1/2013 Petri Larrea .......... F03D 1/0675
403/296
(Continued)

FOREIGN PATENT DOCUMENTS

CN 101230845 A 7/2008
CN 205805834 U 12/2016
(Continued)

OTHER PUBLICATIONS

European Search Report dated Jul. 13, 2018 for Application No. 17210037.2.

*Primary Examiner* — Brian P Wolcott
(74) *Attorney, Agent, or Firm* — Schmeiser, Olsen & Watts, LLP

(57) ABSTRACT

A pultruded fibrous composite strip, a spar cap made from such strips, a wind turbine rotor blade having such a spar cap and a method for making a spar cap from such strips are provided. The strip is stacked with similar strips to form the spar cap. The strip has a substantially constant cross-section defined by first and second mutually opposed and longitudinally extending sides, and by first and second longitudinal edges. The first and the second sides include first and second abutment surfaces, respectively. The first and/or the second abutment surfaces has corrugated profile such that a plurality of longitudinally extending grooves are defined on the abutment surface having the corrugated profile. When the strip is stacked with similar strips, and subsequently resin is infused, the grooves on the abutment surface having the corrugated profile facilitate transfer and flow of the resin into spaces between the stacked strips.

16 Claims, 10 Drawing Sheets

(51) Int. Cl.
  *B29C 70/52* (2006.01)
  *B29L 31/08* (2006.01)
(52) U.S. Cl.
  CPC ..... *B29L 2031/085* (2013.01); *F05B 2230/20* (2013.01); *F05B 2240/301* (2013.01); *F05B 2250/184* (2013.01); *F05B 2250/61* (2013.01); *F05B 2250/611* (2013.01)
(58) Field of Classification Search
  CPC .......... F05B 2240/301; B29D 99/0028; B29C 70/52; B29C 70/345; B29L 2031/085
  See application file for complete search history.

(56) References Cited

U.S. PATENT DOCUMENTS

| | | | | |
|---|---|---|---|---|
| 9,453,420 | B2* | 9/2016 | Appleton | B29C 70/086 |
| 10,105,913 | B2* | 10/2018 | Sandercock | B29C 70/52 |
| 10,156,226 | B2* | 12/2018 | Bech | F03D 1/0675 |
| 10,265,936 | B2* | 4/2019 | Nielsen | B29C 66/524 |
| 10,302,065 | B2* | 5/2019 | Smith | F03D 1/0675 |
| 2008/0181781 | A1 | 7/2008 | Livingston et al. | |
| 2012/0027609 | A1* | 2/2012 | Ogde | B29C 70/541 |
| | | | | 416/226 |
| 2016/0305399 | A1* | 10/2016 | Spandley | B29C 70/543 |
| 2017/0002792 | A1* | 1/2017 | Yarbrough | F03D 1/0675 |
| 2018/0252202 | A1* | 9/2018 | Johnson | B29C 70/342 |
| 2019/0270261 | A1* | 9/2019 | Randall | B29C 70/547 |
| 2020/0016853 | A1* | 1/2020 | Ferrer | F03D 1/0675 |
| 2020/0094442 | A1* | 3/2020 | D'Alesio | B29C 48/07 |
| 2020/0095978 | A1* | 3/2020 | Rodwell | F03D 1/0641 |

FOREIGN PATENT DOCUMENTS

| | | |
|---|---|---|
| EP | 1754589 A1 | 2/2007 |
| EP | 17545889 A1 | 2/2007 |
| EP | 2922690 A1 | 9/2015 |
| GB | 2484942 A | 5/2012 |

* cited by examiner

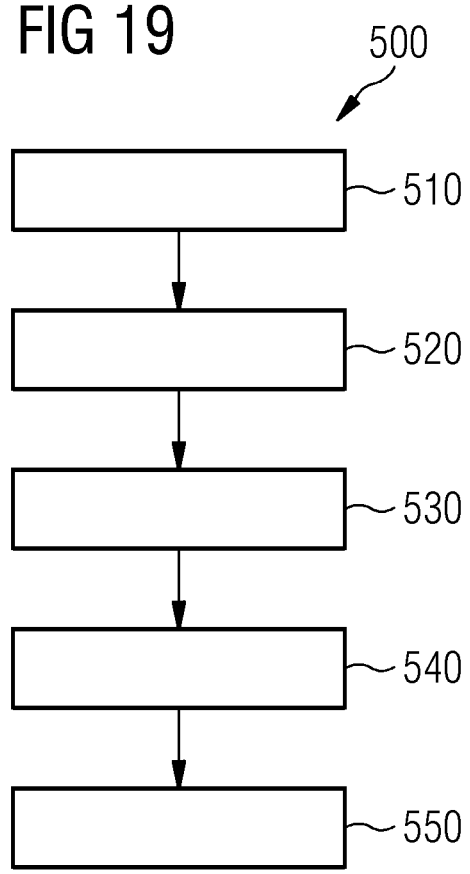

PULTRUDED FIBROUS COMPOSITE STRIPS HAVING CORRUGATED PROFILES FOR WIND TURBINE BLADE SPAR CAPS

CROSS-REFERENCE TO RELATED APPLICATIONS

This application claims priority to European application No. EP 17210037.2 having a filing date of Dec. 22, 2017 the entire contents of which are hereby incorporated by reference.

FIELD OF TECHNOLOGY

The following relates generally to wind turbines, and in particular, to a spar cap of a wind turbine rotor blade. More specifically, the following relates to pultruded unidirectional fibrous composite strips, spar caps having a stack of such pultruded unidirectional fibrous composite strips, and a method for making a spar cap with such pultruded unidirectional fibrous composite strips.

BACKGROUND

Dimensions of wind turbines and wind blades are ever increasing, and consequently are increasing the challenges to overcome during the manufacturing processes of such wind turbine rotor blades. Presently, preferred materials used to manufacture wind turbine rotor blades, hereinafter also referred to as the blades, are glass- and/or carbon-fibre reinforced plastics commonly referred to as "composites", which are generally processed through hand lay-up and resin injection molding processes. Larger sections, longer spans, thicker structural components of the blades make the resin flow very complex to design and optimize, and thus posing an increased risk of manufacturing errors such as transverse wrinkles, poor impregnation of the resin, air pockets, large areas with dry fibres, and so on and so forth. These errors can extend over wide areas, can be very time consuming and very costly to repair and can drastically affect the cost and reliability of the final product i.e. the manufactured blade for the wind turbine. Additionally, hand lay-up of composite structures becomes very time-consuming especially with the increase of thicknesses and number of layers required in manufacturing of the blades.

Recent developments in the wind turbine industry have led to the introduction of pultruded unidirectional fibrous composite strips, i.e. pultruded strips of composite material having unidirectional fibers (UD) reinforcement, mostly in the spar cap constructions, which represent the main load carrying components of the rotor blades.

FIG. 3 shows a cross-sectional view of an airfoil section of a conventionally known rotor blade 210, hereinafter also referred to as the conventional blade 210, having pultruded strips 235 stacked in spar caps 230 of the conventional blade 210. One of these structural elements, i.e. the conventionally known pultruded strips 235 is schematically depicted in FIG. 4. The conventionally known pultruded strip 235, hereinafter also referred to as the conventional strip 235 is defined by planar surfaces and generally resembles a longitudinally, i.e. along a longitudinal axis 299 of the conventional strip 235, elongated rectangular parallelepiped such as a bar or slab, and has a rectangular shaped cross-section when sectioned normally to the longitudinal axis 299. Such conventional strips 235 of FIG. 4 are stacked atop each other to form a stack of the conventional strips 235. The stack is then resin infused to form the conventional spar cap 230.

As shown in FIG. 3, the conventional blade 210 includes a shell 21. The shell 21 is generally made from two half shells i.e. a leeward shell 21a and a windward shell 21b both moulded generally from glass-fibre reinforced plastics. This is generally referred to as the 'butterfly blade' since it has two separate half shells 21a, 21b that are later assembled with each other to form the complete shell 21 for example the two half shells 21a, 21b are glued together to form the shell 21. Alternatively, the blade 210 may include a shell 21 that is formed integrally i.e. the shell 21 does not have the two half shells 21a, 21b but instead is formed in one-part as is done in the well-known integral blade construction of Siemens. Parts of the shell 21 have a sandwich panel construction and comprise a core 22 of lightweight material e.g. polyurethane foam, PET foam, balsa wood, etc. sandwiched between inner and outer surfaces or facesheets 24, 26 of the shell 21. Within the blade 210 is a blade cavity 15. The blade 210 may include one or more spar caps 230, generally in pairs for example first pair of spar caps 230 namely spar caps 230a and 230b and second pairs of spar caps 230 namely spar caps 230c and 230d. Each pair of the spar caps 230 i.e. the spar caps 230a, 230b and the spar caps 230c and 230d are supported by a shear web 34, also referred to as the web 34, which forms a generally known I-beam shape along with the spar caps 230. The spar caps 230a, 230b, 230c, 230d are generally embedded in the shell 21 either partially or completely. One spar cap 230 of each pair is embedded or integrated with the leeward shell 21a and the other spar cap 230 of the pair is embedded or integrated with the windward shell 21b.

The spar caps 230 have a generally elongated rectangular parallelepiped shape such as a bar or slab, elongated in a span wise direction of the blade 210, i.e. in other words the spar cap 230 has a rectangular cross section when sectioned perpendicular to the span of the blade 210. The conventionally known spar cap 230 is made up of the stack(s) of pre-fabricated conventional strips 235 of FIG. 4. The conventional strips 235 are pultruded strips of carbon-fibre reinforced plastic and are substantially flat and have a rectangular cross-section.

During manufacturing of the turbine blade 210 a resin-infusion process is used. Various laminate layers of the shell 21 are laid up, generally by hand-lay, in a mould cavity, the conventional strips 235 are then stacked where the spar caps 230 are to be formed i.e. interspersed between parts of the leeward and the windward shells 21a, 21b, and a vacuum is applied to the mould cavity. Resin is, simultaneously from a far side or subsequently, introduced into the mould. The vacuum pressure causes the resin to flow over and around the laminate layers and the strips 235 of the stack and to infuse into the interstitial spaces between the laid-up layers and between the strips 235. Finally, the resin-infused layup is cured to harden the resin and bond the various laminate layers and the strips 235 together and to each other to form the blade 210.

The strips 235 described above have a relatively smooth and flat outer surface resulting from the pultrusion process used in manufacturing of the strips 235. As a result, when the strips 235 are stacked atop one another in the mould, there is very little space at the interfaces between the strips 235 for allowing adequate amounts of resin to flow therein. The lack of resin in-between the strips 235 results in poor bonding of the strips 235 for example by forming kissing bonds. Improperly bonded strips 235 pose increased risk of delamination occurring in the blade structure and this may lead to damage and compromise of the structural integrity of the turbine blade 235. The aforementioned problem is caused as a result of flat smooth outer surface of the strips 235, whether pultruded or otherwise manufactured, which pack closely with the flat smooth surfaces of other similar strips 235 leaving little or no space for flow of resin during resin infusion.

To solve the aforementioned problem of inadequate space between the flat faced strips 235 some recent techniques use roughening of the flat smooth surface of the strip 235 for example by using peel-ply 236 as shown in FIG. 4, or by using other surface roughening techniques such as sandblasting, sanding, grinding, corona treatment, plasma treatment etc. These techniques require additional steps in the manufacturing process of the blade 210 and thus make the manufacturing process lengthier and resource intensive, for example requiring sanding equipment and manpower, etc.

Thus, in a nutshell the stacking of the conventional strips 235 during manufacturing of the spar caps 230 leaves inadequate amount of interstitial space between the strips 235 causing problem in resin infusion into these interstitial space between the strips 235. Therefore, there exists a need for a technique that ensures adequate amount of interstitial space between the strips that are used to stack with each other to form the spar caps for wind turbine rotor blades, and thus at least partially obviating the problem of inadequate resin infusion and/or resin excess into these interstitial spaces between the stacked strips.

SUMMARY

An aspect relates to a technique that ensures adequate amount of interstitial space between the strips stacked with each other to form the spar caps for wind turbine rotor blades, and thus allowing adequate resin infusion into these interstitial spaces between the stacked strips.

In a first aspect of the present technique a pultruded fibrous composite strip is presented. The pultruded fibrous composite strip, hereinafter also referred to as the strip is for stacking with one or more similar strips to form a spar cap of a wind turbine rotor blade, hereinafter also referred to as the blade. The strip has a substantially constant cross-section defined by first and second mutually opposed and longitudinally extending sides, and by first and second longitudinal edges. The first side includes a first abutment surface and the second side includes a second abutment surface. At least one of the first abutment surface and the second abutment surface has a corrugated profile such that a plurality of longitudinally extending grooves are defined on the first abutment surface and/or the second abutment surface. When the strip is stacked with similar strips, in preparation of resin infusion and subsequent curing of the resin to bond the strip with the other similar strips to form the spar cap, the grooves on the first and/or the second abutment surface of the strip facilitate flow of resin, and thereby better resin infusion between the strips of the stack is achieved compared to conventionally known strips with flat or planar abutment surfaces.

The pultruded fibrous composite strip is a pultruded strip of composite material having unidirectional fibers (UD) reinforcement The pultruded strips have structural fibers, generally longitudinally running along the strip and hence unidirectional, made of glass, carbon, aramid and/or basalt, while the matrix that keeps the fibers together in the strip and protects them from external agents may be, but not limited to, epoxy, vinylester, polyurethane, polyester, etc.

The profile of the abutment surface means an outline, silhouette, contour, shape of the surface. The profile of the abutment surface is represented by a curvature of the surface when observed holistically for the surface.

In an embodiment of the strip, the corrugated profile has a wave shape in a transverse direction of the strip. The transverse direction of the strip extends between the first and the second longitudinal edges of the strip. The transverse direction of the strip is perpendicular to a longitudinal direction of the strip. The wave shape ensures that corrugations are spread across the abutment surface.

In another embodiment of the strip, the wave shape is a symmetric waveform, i.e. the wave shape resembles a symmetric waveform such as symmetric periodic waveform for example a sinusoidal waveform. Thus, the corrugation is spread evenly over the abutment surface.

In another embodiment of the strip, amplitude of the wave shape is between 100 μm (micrometer) and 1000 μm. The amplitude of the wave shape is a distance between a lowest point of a groove and a highest point of a ridge, measured along a thickness of the strip, i.e. measured along a direction perpendicular to the transverse direction of the strip. Thus the grooves are deep enough to ensure proper resin flow through the grooves but not too deep to limit the resin within the groove i.e. in other words the grooves facilitate the flow of resin during resin infusion but then are over-filled and allow flow of resin, in the transverse direction of the strip, to areas of the abutment surfaces adjacent to the grooves.

In another embodiment of the strip, wavelength of the wave shape is between 2 mm (millimeter) and 50 mm. The wavelength of the wave shape is a distance between the two consecutive grooves or between two consecutive ridges formed adjoining a given groove.

In another embodiment of the strip, the first abutment surface and the second abutment surface both have corrugated profiles. The first abutment surface has a first wave shape, and the second abutment surface has a second wave shape, both the first and the second wave shapes extend or are oriented in the transverse direction of the strip, i.e. direction of the strip that extends between the first and the second longitudinal edges of the strip and is perpendicular to a longitudinal direction of the strip. In this embodiment of the strip, the first and the second wave shapes are identical. Thus, stacking of the strips is compact.

In another embodiment of the strip, the first abutment surface and the second abutment surface both have corrugated profiles. The first abutment surface has a first wave shape, and the second abutment surface has a second wave shape, both the first and the second wave shapes extend or are oriented in the transverse direction of the strip, i.e. direction of the strip that extends between the first and the second longitudinal edges of the strip and is perpendicular to a longitudinal direction of the strip. In this embodiment of the strip, the first and the second wave shapes are non-identical, i.e. the first and the second wave shapes differ in amplitude and/or wavelength. Thus, the grooves on the abutment surface of a given strip are not completely closed or filled up by the ridges of the abutment surface of an adjacent strip in the stack.

In another embodiment of the strip, one from the first abutment surface and the second abutment surface has the corrugated profile and the other has a planar surface. The strips when stacked may be stacked in such a way that the abutment surface of a given strip having the corrugated profile faces the abutment surface of an adjacent strip having the planar surface, and vice versa. Thus, the grooves on the abutment surface of the given strip are not closed or filled up by the abutment surface of the adjacent strip in the stack.

In another embodiment of the strip, the first abutment surface and/or the second abutment surface having the corrugated profile, i.e. the abutment surface or the abutment surfaces having the corrugated profile according to the present technique, include or includes one or more trenches formed therein and extending between at least two adjacent longitudinally extending grooves of the plurality of longitudinally extending grooves present on the abutment surface. The one or more trenches are configured to fluidly connect the two adjacent longitudinally extending grooves i.e. the trenches allow or facilitate flow of resin between the two adjacent grooves. The trenches may have different orientations with respect to the grooves for example the trenches may oriented at 90 degree, 45 degree, etc. with respect to the grooves.

In another embodiment of the strip, the strip includes a first peel-ply layer on the first abutment surface and/or a second peel-ply layer on the second abutment surface. The peel-ply layer at least partially covers the abutment surface on which the peel-ply layer is present. The peel-ply layer is present on the abutment surface(s) having the corrugated profile. The peel-ply or the peel-plies may be removed before stacking of the strips and before performing resin infusion and the removal of the peel-ply or the peel-plies provides a roughened surface on the abutment surface from where the peel-ply has been removed.

In a second aspect of the present technique, a spar cap for a wind turbine rotor blade is presented. The spar cap includes a plurality of pultruded fibrous composite strips stacked with one or more similar strips to form a stack of the strips. Each of the strips is as described hereinabove for the first aspect of the present technique. In the stack, the strips are oriented such that one of the abutment surfaces, i.e. either the first or the second abutment surface of the strip, of one of the strips of the stack faces one of the abutment surfaces of an adjacent strip, i.e. faces either the first or the second abutment surface of the adjacent strip of the stack. The spar cap with such strips has better resin bonding compared to the conventional spar caps without strips with corrugated profiles.

In a third aspect of the present technique, a wind turbine rotor blade is presented. The wind turbine rotor blade, hereinafter also referred to as the blade, has at least one spar cap extending longitudinally in a span-wise direction of the blade. The spar cap includes a plurality of pultruded fibrous composite strips stacked with one or more similar strips. Each of the strips is according to the first aspect of the present technique as described hereinabove. Each of the strips is oriented such that the first and the second sides of the strip longitudinally extend along the span-wise direction of the blade and are spaced apart in a flap-wise direction of the blade, and the first and the second edges of the strip longitudinally extend along the span-wise direction of the blade and are spaced apart in a chordwise direction of the blade. The blade having the spar cap according to the present technique has better resin bonding between the constituent strips of the spar cap as compared to the conventional spar caps without strips with corrugated profiles.

In a fourth aspect of the present technique a method for making a spar cap for a wind turbine rotor blade is presented. In the method of the present technique, a plurality of pultruded fibrous composite strips is provided. Each of the strips is according to the first aspect of the present technique described hereinabove. The strips are then stacked in a mould to form a stack of the strips. The strips are stacked such that in the stack so formed one of the abutment surfaces, i.e. either the first abutment surface or the second abutment surface of one of the strips of the stack faces one of the abutment surfaces, i.e. either the first abutment surface or the second abutment surface, of an adjacent strip of the stack to define longitudinally extending resin flow channels, therein between. Each of the resin flow channels includes at least one of longitudinally extending grooves defined on one of the abutment surfaces facing each other in the stack. Thereafter, in the method, resin is supplied to the stack. The resin is caused to infiltrate into the longitudinally extending resin flow channels. Finally, in the method, the resin is cured to bond the adjacent strips together.

In an embodiment of the method, one or more of the strips include a first peel-ply layer at least partially covering the first abutment surface and/or a second peel-ply layer at least partially covering the second abutment surface. The peel-ply layer is present on the surface having the corrugated profile. In the method the first and/or the second peel plies are removed from their respective abutment surfaces before stacking the strips in the mould to form the stack of the strips.

BRIEF DESCRIPTION

Some of the embodiments will be described in detail, with references to the following Figures, wherein like designations denote like members, wherein:

FIG. 1 schematically depicts a wind turbine having a wind turbine rotor blade in which a spar cap made from pultruded fibrous composite strips of the present technique is incorporated, in accordance with embodiments of the present invention;

FIG. 2 schematically depicts the wind turbine rotor blade in which the spar cap made from the pultruded fibrous composite strips of the present technique is incorporated, in accordance with embodiments of the present invention;

Figure 2:
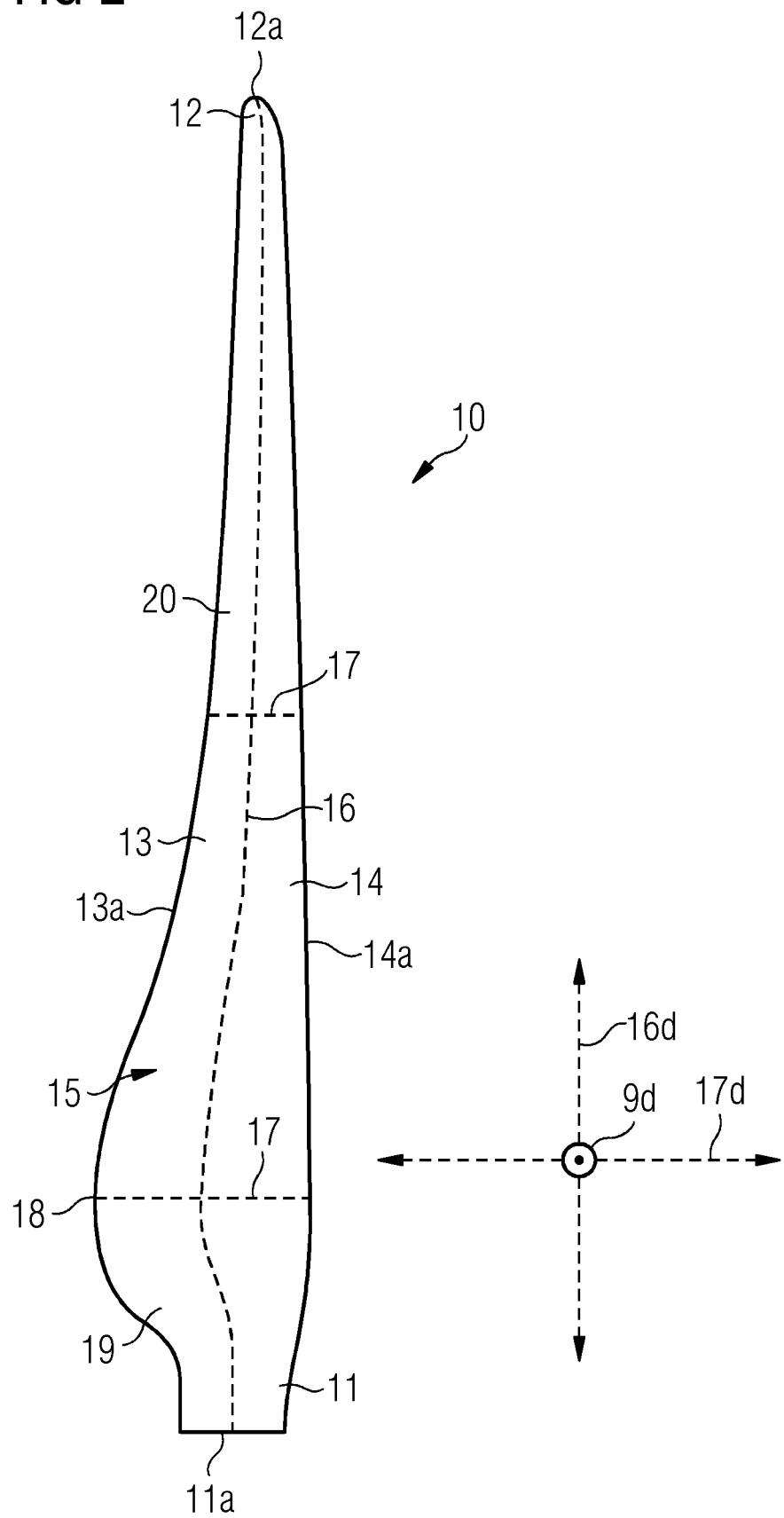
Figure 5:
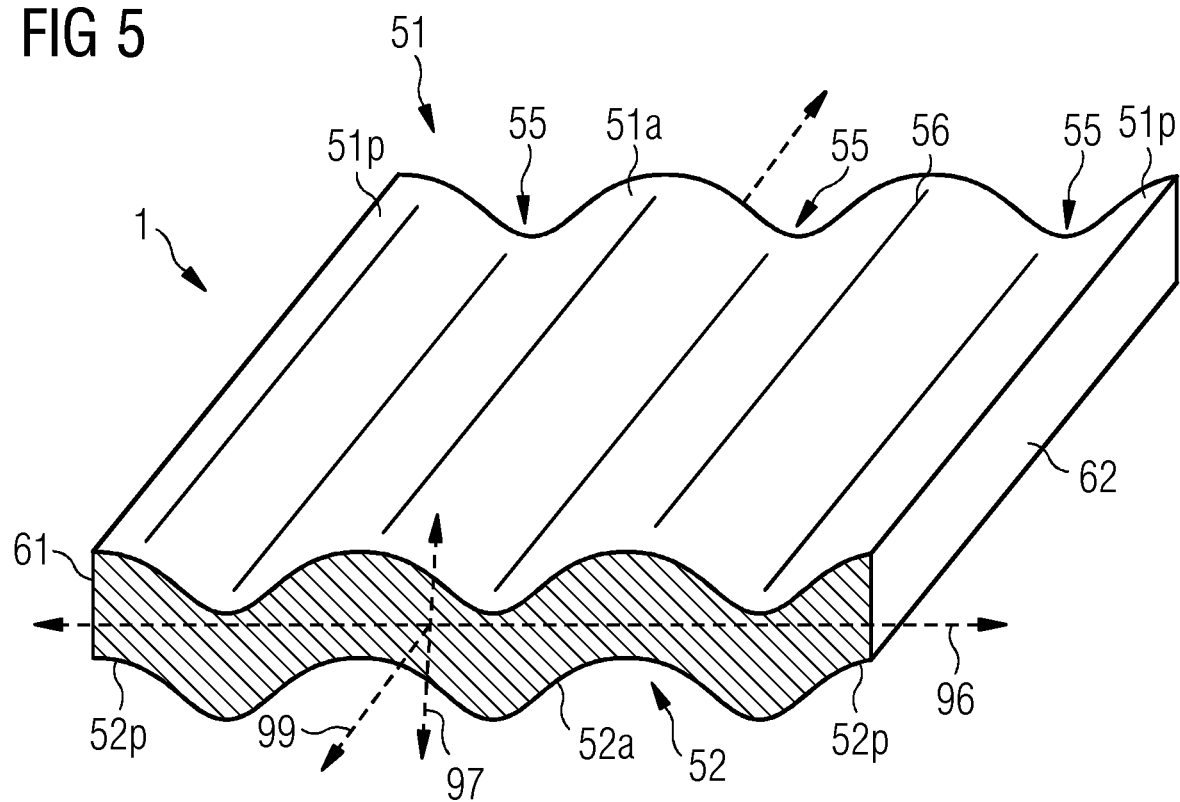
Figure 6:
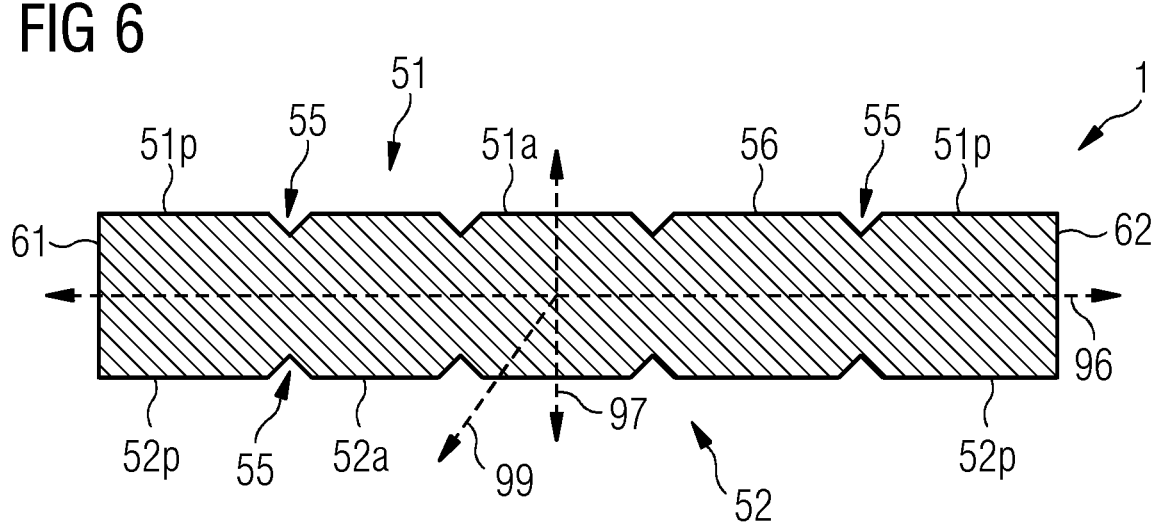
Figure 7:
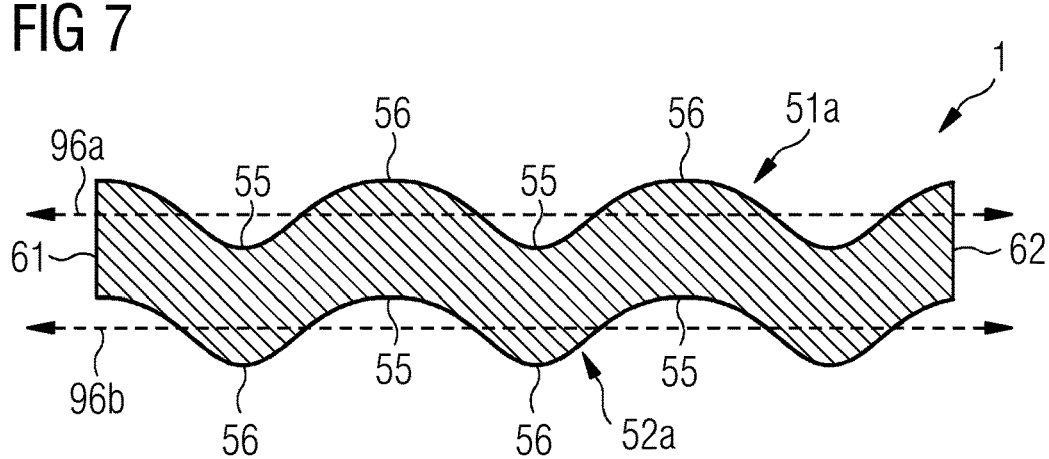
Figure 8:
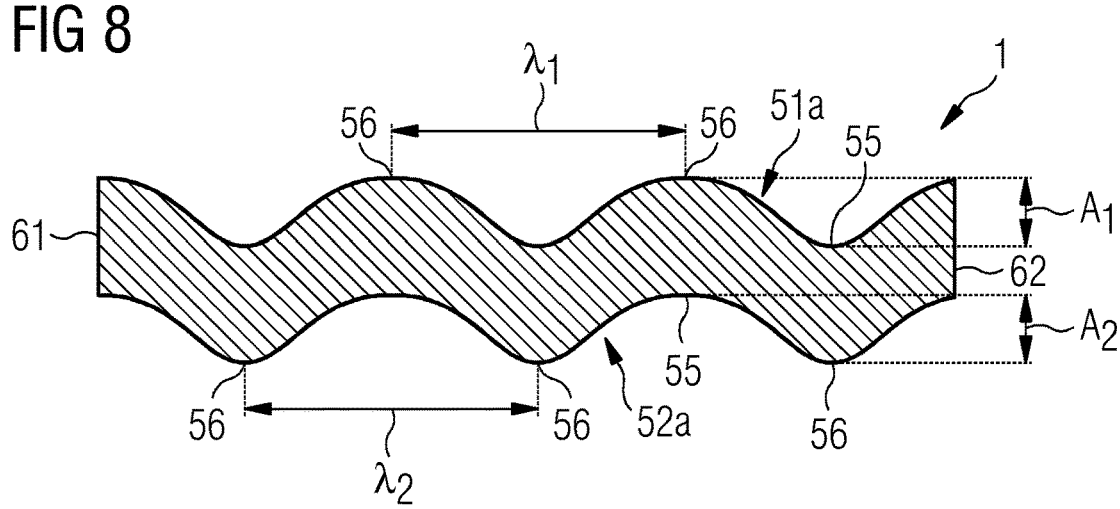
Figure 9:
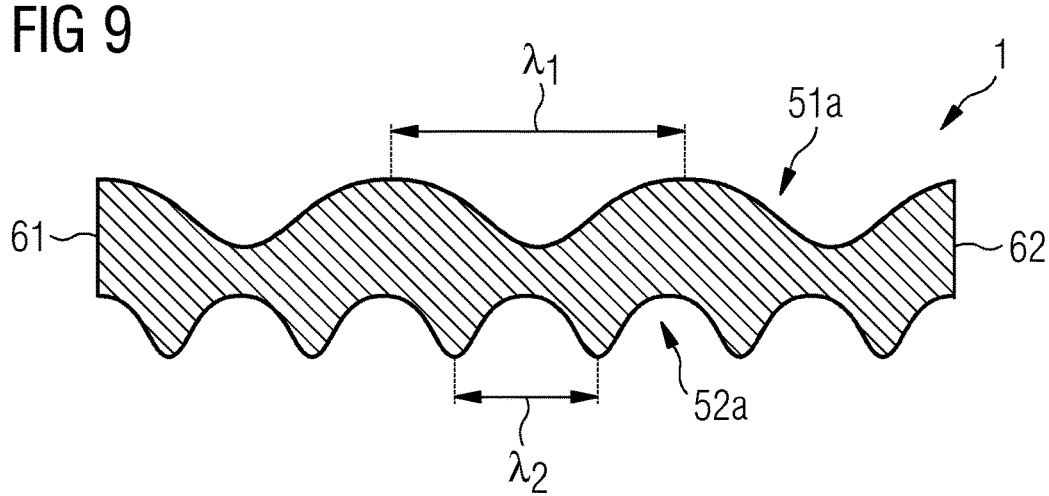
Figure 10:
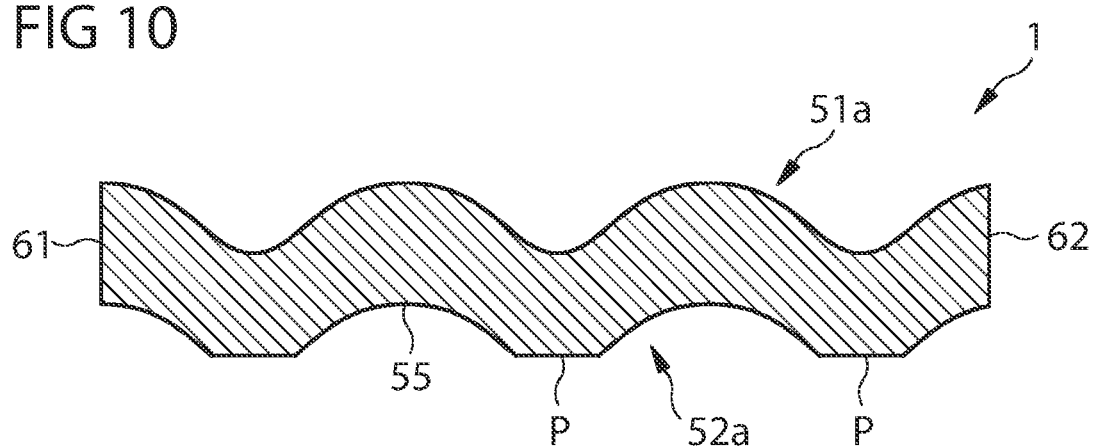
Figure 11:
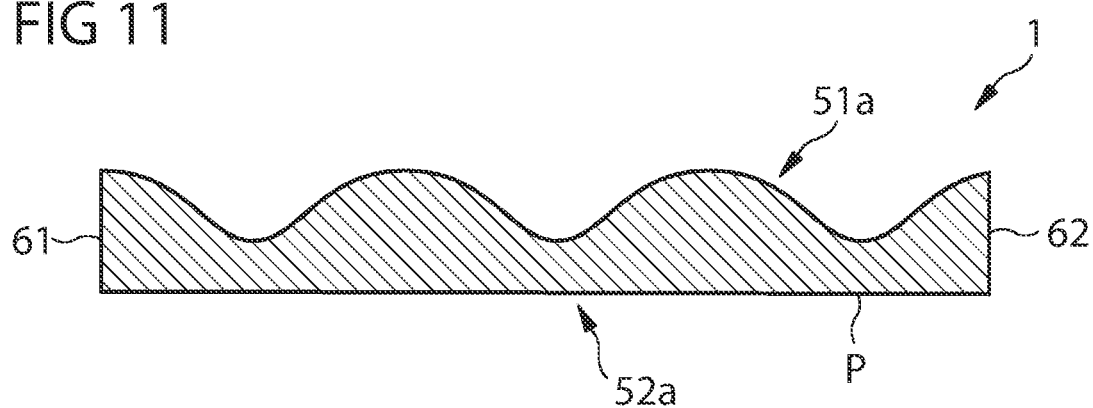
Figure 12:
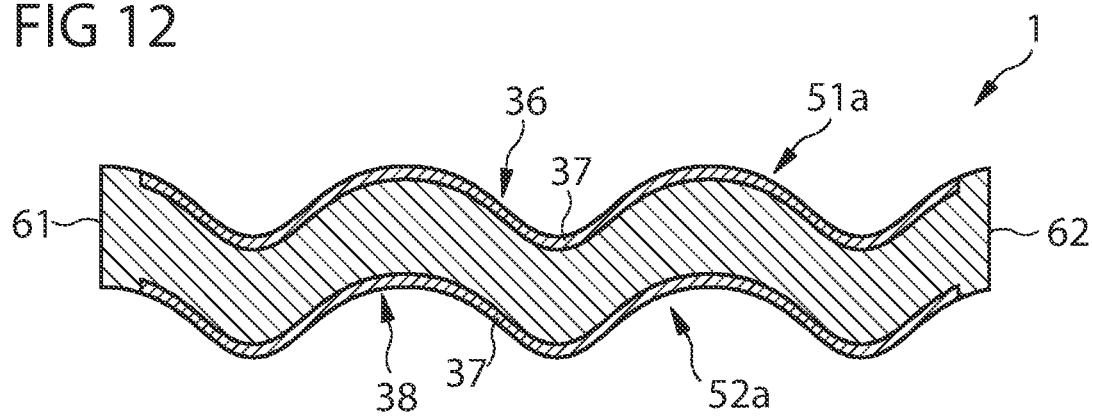
Figure 13:
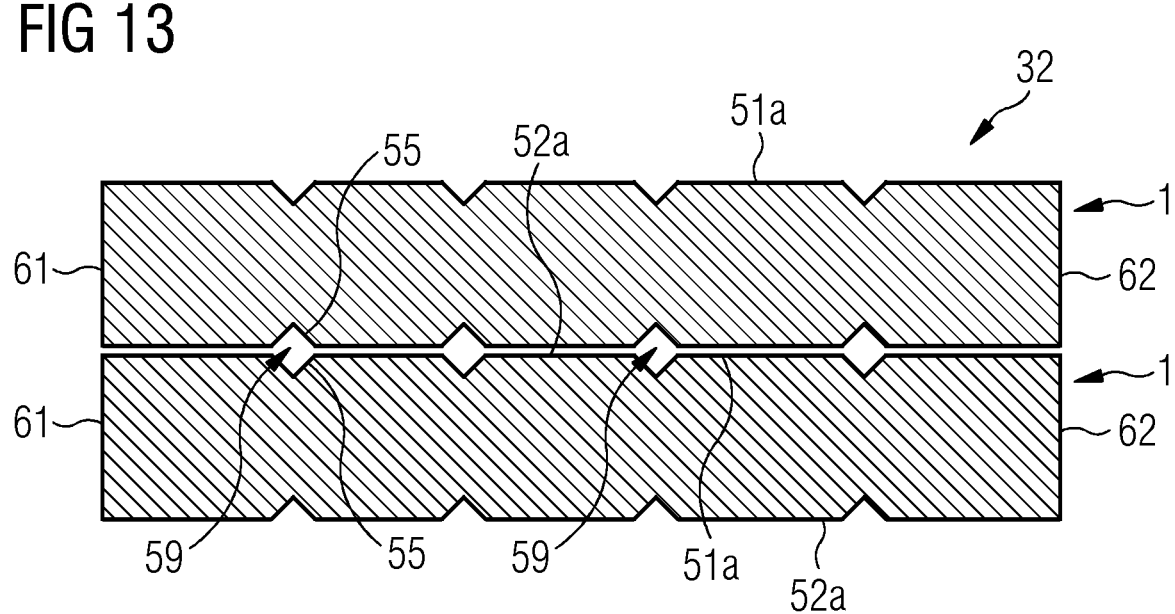
Figure 14:
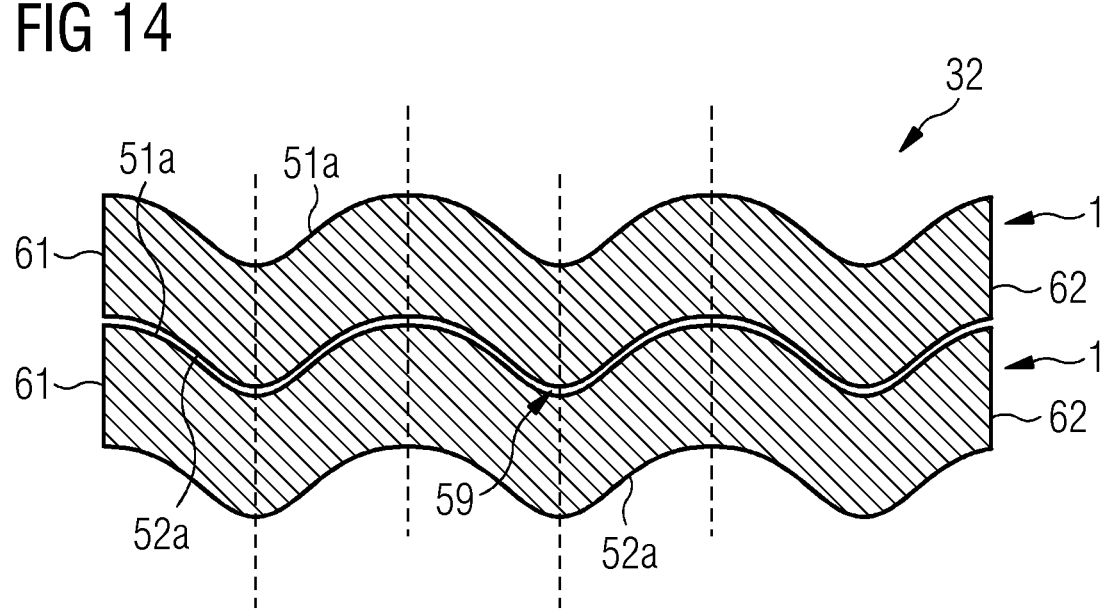
Figure 15:
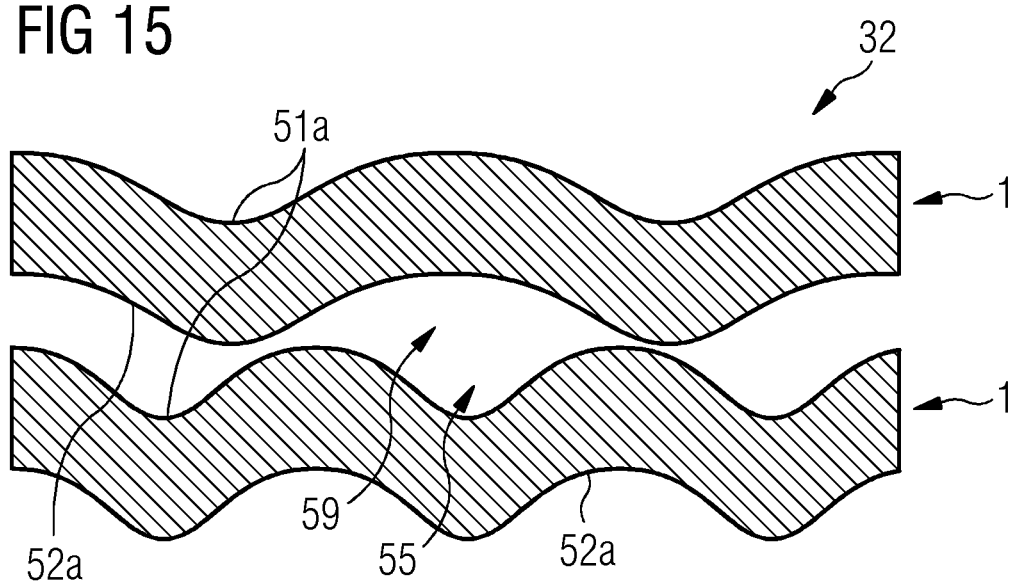
Figure 16:
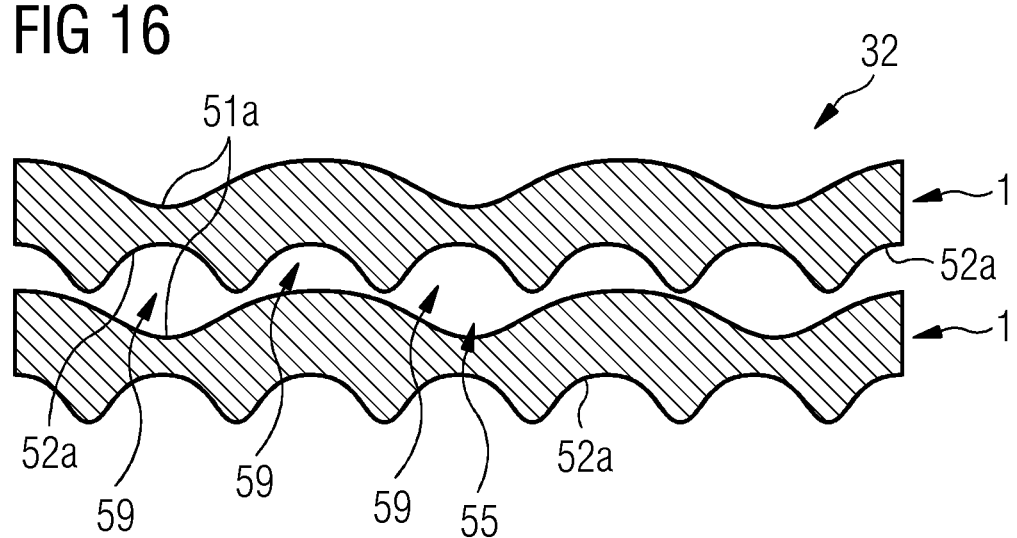
Figure 17:
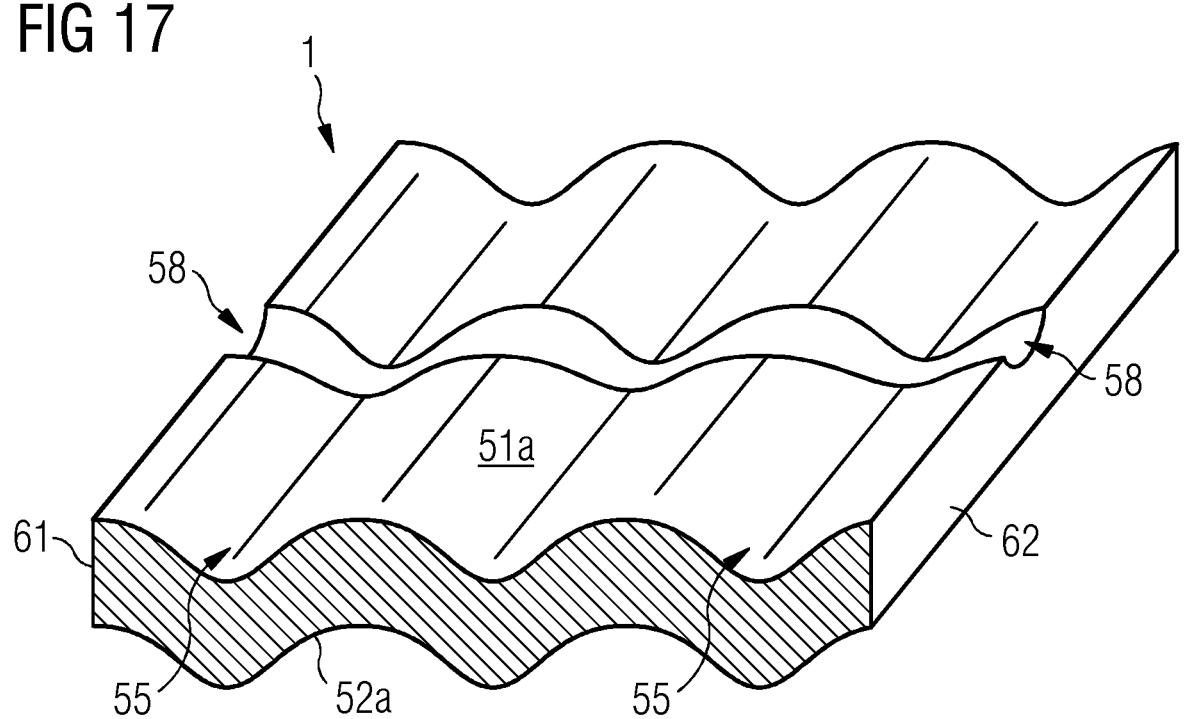
Figure 18:
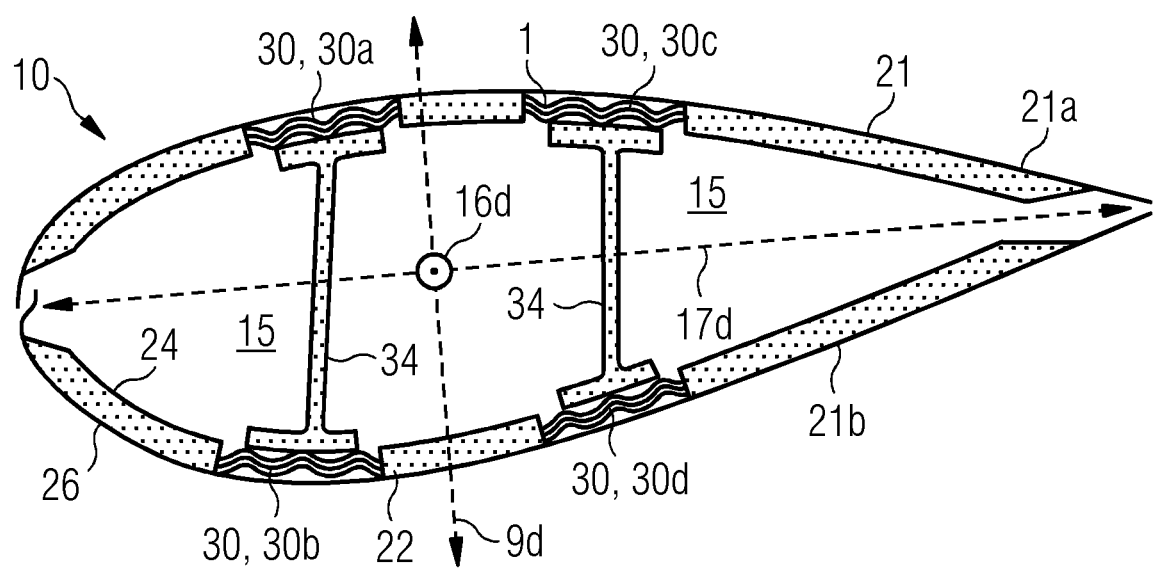

FIG. 5 schematically depicts a perspective view of an exemplary embodiment of a pultruded fibrous composite strips of the present technique, in accordance with embodiments of the present invention;

FIG. 6 schematically depicts a cross-sectional view of another exemplary embodiment of the pultruded strip of the present technique, in accordance with embodiments of the present invention;

FIG. 7 schematically depicts a cross-sectional view of the exemplary embodiment of the pultruded strip of FIG. 5 depicting exemplary wave shapes of first and second abutment surfaces of the strip of the present technique, in accordance with embodiments of the present invention;

FIG. 8 schematically depicts a cross-sectional view of the strip of FIG. 7 depicting a scheme of measurements of the wave shapes, in accordance with embodiments of the present invention;

FIG. 9 schematically depicts a cross-sectional view of another exemplary embodiment of the strip of the present technique depicting exemplary non-identical wave shapes of the first and the second abutment surfaces of the strip of the present technique, in accordance with embodiments of the present invention;

FIG. 10 schematically depicts a cross-sectional view of yet another exemplary embodiment of the pultruded strip of the present technique depicting an exemplary wave shape of the first abutment surface and depicting planar surfaces as part of the second abutment surface of the strip of the present technique, in accordance with embodiments of the present invention;

FIG. 11 schematically depicts a cross-sectional view of further exemplary embodiment of the pultruded strip of the present technique depicting an exemplary wave shape of the first abutment surface and depicting planar second abutment surface of the strip of the present technique, in accordance with embodiments of the present invention;

FIG. 12 schematically depicts a cross-sectional view of an exemplary embodiment of the pultruded strip of the present technique depicting a first peel-ply layer and a second peel-ply layer on the first and the second abutment surfaces, respectively, in accordance with embodiments of the present invention;

FIG. 13 schematically depicts an exemplary embodiment of two pultruded fibrous composite strips of the present technique stacked with each other to manufacture the spar cap of the present technique, in accordance with embodiments of the present invention;

FIG. 14 schematically depicts another exemplary embodiment of two pultruded fibrous composite strips of the present technique stacked with each other to manufacture the spar cap of the present technique, in accordance with embodiments of the present invention;

FIG. 15 schematically depicts yet another exemplary embodiment of two pultruded fibrous composite strips of the present technique stacked with each other to manufacture the spar cap of the present technique, in accordance with embodiments of the present invention;

FIG. 16 schematically depicts a further exemplary embodiment of two pultruded fibrous composite strips of the present technique stacked with each other to manufacture the spar cap of the present technique, in accordance with embodiments of the present invention;

FIG. 17 schematically depicts a perspective view of an exemplary embodiment of the strip of the present technique having a trench connecting two adjacent grooves in the strip, in accordance with embodiments of the present invention;

FIG. 18 depicts a cross-sectional view of an exemplary embodiment of an airfoil of the wind turbine rotor blade of FIG. 2 having a spar cap made from the strips of the present technique, in accordance with embodiments of the present invention; and FIG. 19 presents a flow chart depicting a method for making a spar cap for a wind turbine rotor blade, in accordance with embodiments of the present invention.

Hereinafter, above-mentioned and other features of the present technique are described in detail. Various embodiments are described with reference to the drawing, wherein like reference numerals are used to refer to like elements throughout. In the following description, for the purpose of explanation, numerous specific details are set forth in order to provide a thorough understanding of one or more embodiments. It may be noted that the illustrated embodiments are intended to explain, and not to limit embodiments of the invention. It may be evident that such embodiments may be practiced without these specific details.

It may be noted that in the present disclosure, the terms "first", "second", "third" etc. are used herein only to facilitate discussion and carry no particular temporal or chronological significance unless otherwise indicated.

DETAILED DESCRIPTION

Figure 1:
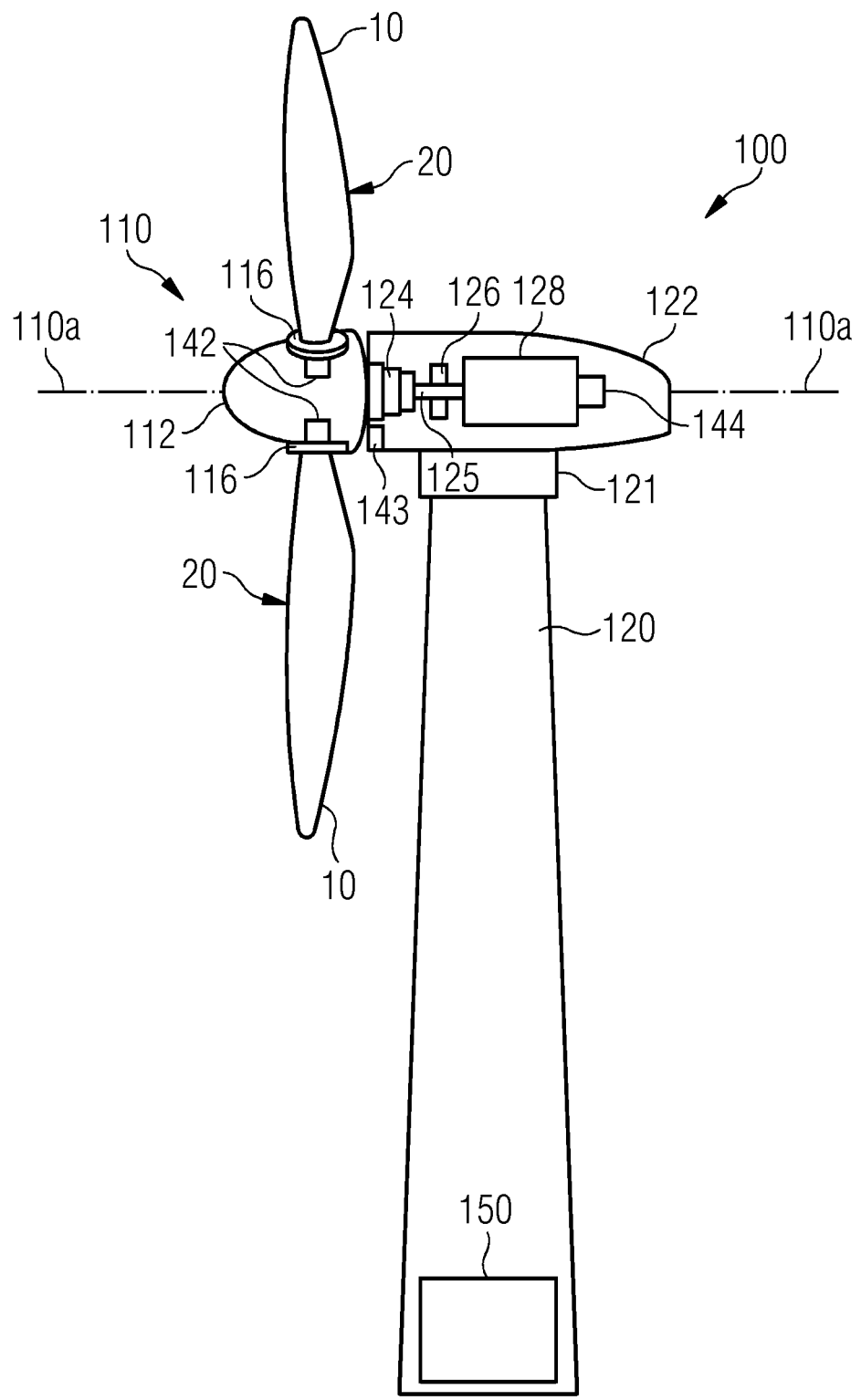

FIG. 1 shows an exemplary embodiment of a wind turbine 100 of the present technique. The wind turbine 100 includes a tower 120, which is mounted on a fundament (not shown). A nacelle 122 is mounted on top of the tower 120 and rotatable with regard to the tower 120 by means of a yaw angle adjustment mechanism 121 such as yaw bearings and yaw motors. The yaw angle adjustment mechanism 121 functions to rotate the nacelle 122 around a vertical axis (not shown) referred to as a yaw axis, which is aligned with the longitudinal extension of the tower 120. The yaw angle adjustment mechanism 121 rotates the nacelle 122 during operation of the wind turbine 100 to ensure that the nacelle 122 is appropriately aligned with the current wind direction to which the wind turbine 100 is subjected.

The wind turbine 100 further includes a rotor 110 having at least a rotor blade 10, and generally three rotor blades 10, although in the perspective view of FIG. 1 only two rotor blades 10 are visible. One of the rotor blades 10 is schematically depicted in FIG. 2. The rotor 110 is rotatable around a rotational axis 110a. The rotor blades 10, hereinafter also referred to as the blades 10 or as the blade 10 when referring to one of the blades 10, are generally mounted at a driving collar 112, also referred to as a hub 112. The hub 112 is mounted rotatable with regard to the nacelle 122 by means of a main bearing (not shown). The hub 112 is rotatable about the rotational axis 110a. Each of the blades 10 extends radially with respect to the rotational axis 110a and has an airfoil section 20.

In between the hub 112 and each of the rotor blades 10, is provided a blade adjustment mechanism 116 in order to adjust the blade pitch angle of the blade 10 by rotating the respective blade 10 about a longitudinal axis (not shown) of the blade 10. The longitudinal axis of each of the blade 10 is aligned substantially parallel with the longitudinal extension of the respective blade 10. The blade adjustment mechanism 116 functions to adjust blade pitch angles of the respective blade 10.

The wind turbine 100 includes a main shaft 125 that rotatably couples the rotor 110, particularly the hub 112, to a generator 128 housed within the nacelle 122. The hub 112 is connected to a rotor of the generator 128. In an exemplary embodiment (not shown) of the wind turbine 100, the hub 112 is connected directly to the rotor of the generator 128, thus the wind turbine 100 is referred to as a gearless, direct drive wind turbine 100. As an alternative, as shown in the exemplary embodiment of FIG. 1, the wind turbine 100 includes a gear box 124 provided within the nacelle 122 and the main shaft 125 connects the hub 112 to the generator 128 via the gear box 124, thereby the wind turbine 100 is referred to as a geared wind turbine 100. The gear box 124 is used to convert the number of revolutions of the rotor 110 into a higher number of revolutions of the main shaft 125, and consequently of the rotor of the generator 128. Furthermore, a brake 126 is provided in order to stop the operation of the wind turbine 100 or to reduce the rotational speed of the rotor 110 for instance in case of a very strong wind and/or in case of an emergency.

The wind turbine 100 further includes a control system 150 for operating the wind turbine 100 at desired operational parameters, for example at a desired yaw angle, with a desired blade pitch, at a desired rotational speed of the rotor 110, and so on and so forth. The controlling and/or adjusting of the operational parameters are performed to obtain an optimized power generation under the existent conditions for example under existent wind conditions and other weather conditions.

The wind turbine 100 may further include different sensors for example a rotational speed sensor 143, a power sensor 144, angle sensors 142, etc. that provide inputs to the control system 150 or other components of the wind turbine 100 to optimize operation of the wind turbine 100.

Furthermore, as shown in FIG. 2, the rotor blade 10 includes a root section 11 having a root 11a and an airfoil section 20. Generally, the rotor blade 10 includes a transition section 90 in between the root section 11 and the airfoil section 20. The airfoil section 20, hereinafter also referred to as the airfoil 20, includes a tip section 12 having a tip 12a. The root 11a and the tip 12a are separated by a span 16, of the rotor blade 10, which follows the shape of the rotor blade 10. A direction along or parallel to the span 16 is referred to as span-wise direction 16d. The tip section 12, including the tip 12a therein, extends from the tip towards the root 11a up to a span-wise position of approximately 33.3% (percent), i.e. one third of the total length of the blade 10, as measured from the tip 12a. The tip 12a extends within the tip section 12 towards the root 11a up to a span-wise position of approx. one meter. The rotor blade 10 includes a leading-edge section 14 having a leading edge 14a, and a trailing edge section 13 having a trailing edge 13a. The trailing edge section 13 surrounds the trailing edge 13a. Similarly, the leading-edge section 14 surrounds the leading edge 14a.

Figure 3:
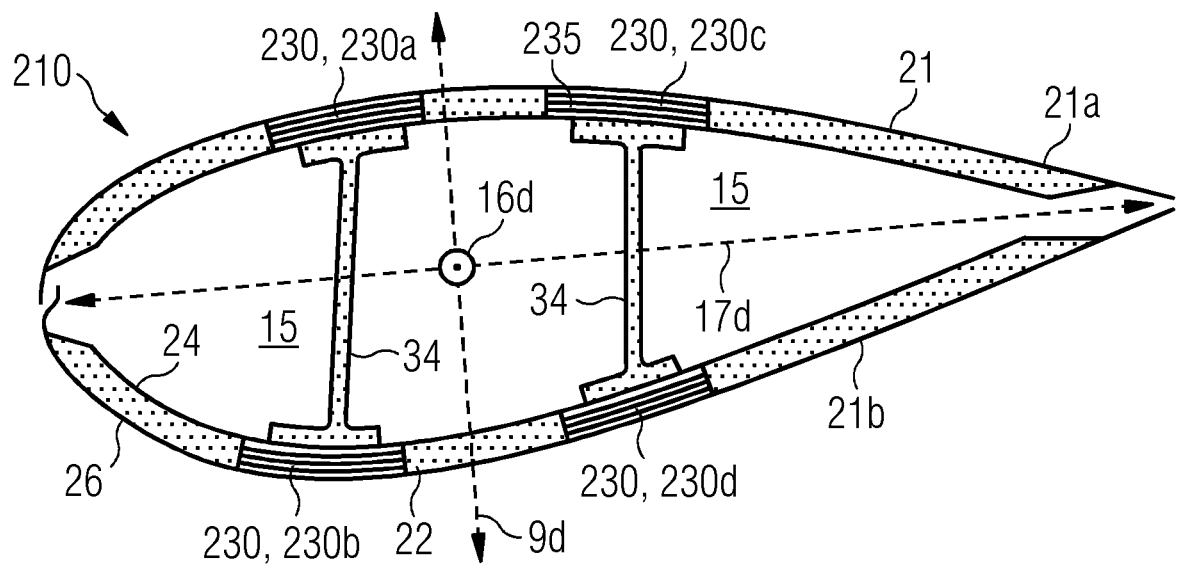
FIG. 3 depicts a cross-sectional view of an airfoil of a conventionally known turbine blade having a conventionally known spar cap made from conventionally known pultruded strips.

At each span-wise position perpendicular to the span 16, a chord line 17 that connects the leading edge 14a and the trailing edge 13a can be defined. A direction along or parallel to the chord line 17 is referred to as chord-wise direction 17d. FIG. 3 depicts two such chord lines 17 at two different span-wise positions. Furthermore, a direction mutually perpendicular to the span-wise direction 16d and to the chord-wise direction 17d is referred to as a flap-wise direction 9d. The rotor blade 10 has a shoulder 18 that is a section of the rotor blade 10 where the chord line 17 has maximum chord length, i.e. in example of FIG. 2 at the chord line 17 that is depicted towards the root 11a.

In the wind turbine 100, one or more of the blades 10 include one or more spar caps 30 shown in FIG. 18 according to the present technique. In accordance with the present technique, the spar cap 30 of the present technique includes a component of such a spar cap 30 i.e. a pultruded strip 1 as shown in FIGS. 5 to 18. The technique also presents a method 500 for making such a spar cap 30 using the pultruded strip 1 of the present technique as shown in FIG. 19. Hereinafter, FIGS. 5 to 19 in combination with FIGS. 1 and 2 have been referred to further explain the present technique. It may be noted that the rotor blade 10 of the present technique differs from the conventionally known rotor blade 210 as shown in FIG. 3 only for the spar cap 30 and the pultruded strips 1, and other components of the rotor blade 10 are same as described hereinabove with reference to FIG. 3 for the conventional blade 210, for example the web 34, the leeward and windward shells 21a, 21b, etc. The difference between the present technique as compared to the conventionally known techniques is in the geometrical structure of the pultruded strip 1 as opposed to the structure of the conventional strip 235, and in the spar cap 30 resulting from the use of the pultruded strips 1 as opposed to the spar caps 230 formed from the conventional strips 235.

FIGS. 5 and 6 show exemplary embodiments of the pultruded strip 1 of the present technique. As aforementioned, the pultruded strips 1, hereinafter also referred to as the strip 1 are pultruded unidirectional fibrous composite strips. The strip 1, depicted in FIGS. 5 to 18 is a pultruded strip of composite material having unidirectional fibers (UD) reinforcement i.e. the strips 1 have structural fibers, generally longitudinally running along the strip and hence unidirectional, made of glass, carbon, aramid and/or basalt, while the matrix that keeps the fibers together in the strip 1 and protects the fibers from external agents may be, but not limited to, epoxy, vinylester, polyurethane, polyester, etc. Each of the strips 1 are formed by pultrusion, a continuous process similar to extrusion, in which fibers e.g. glass-fibers or carbon-fibers are pulled through a supply of liquid resin i.e. through the material of the matrix that keeps the fibers together, and through dies that shape the strip 1 to the shape according to the present technique. The resin i.e. the matrix material is then cured, for example by heating in an open chamber, or by employing heated dies that cure the resin as the strip 1 is pultruded.

The strip 1 is used to form the spar cap 30 of FIG. 18 by stacking the strip 1 with one or more similar strips 1 to form the spar cap 30 of the rotor blade 10 of the wind turbine 100. As shown in FIG. 5, the strip 1 has a longitudinal axis 99 extending generally in the direction in which the strip 1 was pultruded when manufactured, and which is also the direction along which the fibers (not shown) of the strip 1 extend. The strip 1, as depicted from a cross-section of the strip 1 as shown in FIG. 6, and as can be inferred from FIG. 5, has a first side 51 and a second side 52 opposite to the first side 51, and a first edge 61 and a second edge 62 opposite to the first edge 61. The strip 1 has a substantially constant cross-section, i.e. the strip 1 maintains its cross-sectional shape and dimensions at positions along the longitudinal axis 99. The strip 1 is defined by the first and the second mutually opposed and longitudinally extending sides 51, 52 and by the first and the second longitudinal edges 61, 62 i.e. the sides 51, 52 and the edges 61, 62 extend generally parallelly to the longitudinal axis 99 of the strip 1.

The first side 51 includes a first abutment surface 51a. The first abutment surface 51a may be the entire surface of the first side 51 i.e. covering the entire expanse between the first and the second edges 61, 62. Alternatively, the first abutment surface 51a may be a substantial part of the entire surface of the first side 51 and may be limited by a border or peripheral region or peripheral surface region of the first side 51 towards the first and the second edges 61, 62, or in other words, the surface of the first side 51 has at least two regions—namely the two peripheral regions 51p and the first abutment surface 51a sandwiched between the peripheral regions 51p. The width of each of the peripheral region 51p i.e. expanse of the peripheral region 51p, as measured along the first side 51 and perpendicular to the longitudinal axis 99 may be between 2% and 10% of a distance between the first and the second edge 61, 62 as measured along the first side 51 and perpendicular to the longitudinal axis 99. The advantage of having the peripheral regions 51p is that presence of the peripheral regions 51p allows incorporation of a peel ply (not shown in FIGS. 5 and 6) on the surface of first side 51 during the pultrusion process. When a peel ply is incorporated on the surface of first side 51 during the pultrusion process, the area or region of the surface of the first side 51 covered by the peel-ply is the first abutment surface 51a, and the area or region of the surface of the first side 51 not covered by the peel-ply is the first peripheral regions 51p. When a peel ply is incorporated on the surface of first side 51, a surface of the peel ply is flush with the first peripheral regions 51p.

Similarly, the second side 52 includes a second abutment surface 52a. The second abutment surface 52a may be the entire surface of the second side 52 i.e. covering the entire expanse between the first and the second edges 61, 62. Alternatively, the second abutment surface 52a may be a substantial part of the entire surface of the second side 52 and may be limited by a border or peripheral region or peripheral surface region of the second side 52 towards the first and the second edges 61, 62, or in other words, the surface of the second side 52 has at least two regions—namely the two peripheral regions 52p and the second abutment surface 52a sandwiched between the peripheral regions 52p. The width of each of the peripheral region 52p i.e. expanse of the peripheral region 52p, as measured along the second side 52 and perpendicular to the longitudinal axis 99 may be between 2% and 10% of a distance between the first and the second edge 61, 62 as measured along the second side 52 and perpendicular to the longitudinal axis 99. The advantage of having the peripheral regions 52p is that presence of the peripheral regions 52p allows incorporation of a peel ply (not shown in FIGS. 5 and 6) on the surface of second side 52 during the pultrusion process. When a peel ply is incorporated on the surface of second side 52 during the pultrusion process, the area or region of the surface of the second side 52 covered by the peel-ply is the second abutment surface 52a, and the area or region of surface of the second side 52 not covered by the peel-ply is the second peripheral regions 52p. When a peel ply is incorporated on the surface of second side 52, a surface of the peel ply is flush with the second peripheral regions 52p.

Figure 4:
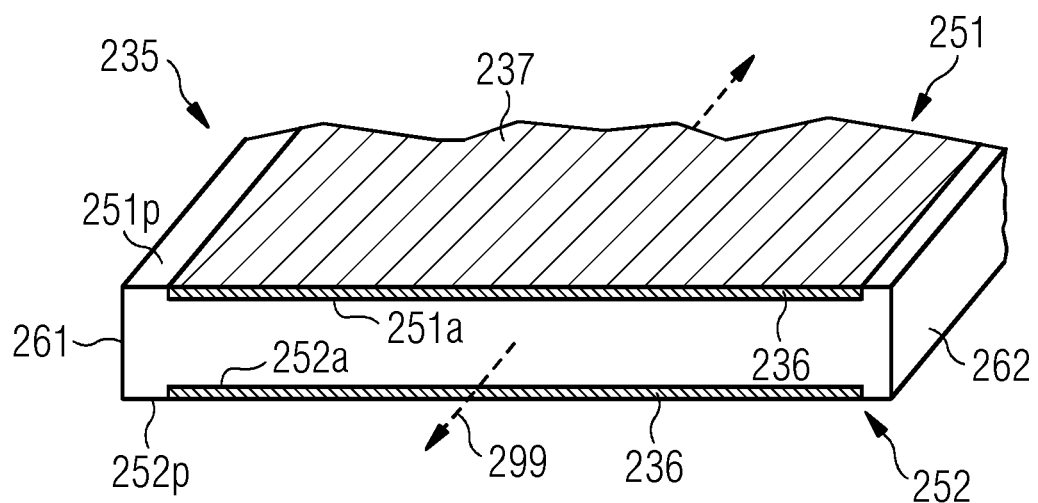
FIG. 4 depicts a conventionally known pultruded strip used to manufacture the conventionally known spar cap.

According to aspects of the present technique, at least one of the first abutment surface 51a and the second abutment surface 52a has a corrugated profile, i.e. shaped into a series of parallel ridges 56 and grooves 55. As a result of the corrugated profile, a plurality of longitudinally extending grooves 55 are defined on the first abutment surface 51a and/or the second abutment surface 52a i.e. on the abutment surface that has the corrugated profile—which may be both the abutment surfaces 51a and 52a, or one of the abutment surfaces i.e. either 51a or 52a. The ridges 56 may be hill-shaped as shown in FIG. 5 or may be flat as shown in FIG. 6. The groove 55 may be understood as a pit, trench, channel, canal or valley that extends along the longitudinal axis 99 and on the abutment surface 51a, 52a that has the corrugated profile. When the strip 1 is stacked with similar strips 1, as later depicted in FIGS. 13 to 16, in preparation of resin infusion and subsequent curing of the resin to bond the strip 1 with the other similar strips 1 to form the spar cap 30, the grooves 55 on the first and/or the second abutment surfaces 51a, 52a of the strip 1 facilitate flow of resin, and thereby better resin infusion between the strips 1 of the stack is achieved compared to conventionally known strips 235 with flat or planar abutment surfaces 251a, 252a on the first and the second sides 251, 252, respectively, extending between the first and the second edges 261, 262 of the conventional strip 235 shown in FIG. 4.

FIG. 5 and FIG. 7 schematically depict an embodiment of the strip 1 in which the corrugated profile has a wave shape in a transverse direction 96 of the strip 1. The transverse direction 96 of the strip extends between the first and the second longitudinal edges 61, 62 of the strip. The transverse direction 96 of the strip 1 is perpendicular to the longitudinal direction or axis 99 of the strip 1. FIG. 7 shows two axes namely axis 96a and axis 96b that extend along the transverse direction 96 of the strip 1. As can be seen in the depiction of FIG. 7, the first abutment surface 51a has the corrugated profile in form of the wave shape, and the second abutment surface 52a also has the corrugated profile in form of the wave shape. The first abutment surface 51a, when observed in the direction of the longitudinal axis depicts the wave shape. The axis 96a is represented only for the purpose of depiction of the wave shape of the first abutment surface 51a. Similarly, the second abutment surface 52a, when observed in the direction of the longitudinal axis depicts the wave shape. The axis 96b is represented only for the purpose of depiction of the wave shape of the second abutment surface 52a.

In another embodiment of the strip, as also depicted in FIG. 7, the wave shape is a symmetric waveform, i.e. the wave shape resembles a symmetric waveform such as symmetric periodic waveform for example a sinusoidal waveform. Thus, the corrugation is spread evenly over the abutment surface 51a, 52a. It may be noted that the number of grooves 55 formed on the abutment surfaces 51a, 52a as shown in FIGS. 5 to 18 are provided as way of explanation and not as a way of limitation. It may also be noted that the number of grooves 55 formed on the abutment surface 51a, 52a that has corrugated profile are more than two, for example three, four, five, six, and so on and so forth.

FIG. 8 provides a scheme of measurements for the corrugated profile when present in form of a wave shape, and particularly when present in form of the sinusoidal waveform. As shown in FIG. 8, the wave shape has amplitude $A_1$ for the waveform on the first abutment surface 51a and/or amplitude $A_2$ for the waveform on the second abutment surface 52a. Similarly, the wave shape has wavelength $\lambda_1$ for the waveform on the first abutment surface 51a and/or wavelength $\lambda_2$ for the waveform on the second abutment surface 52a. In general, the amplitude A, i.e. either $A_1$ and/or $A_2$, is between 100 μm (micrometer) and 1000 μm. Independently of the aforementioned range for the amplitude A, in general the wavelength $\lambda$, i.e. either $\lambda_1$ and/or $\lambda_2$, of the wave shape is between 2 mm and 50 mm. The wavelength $\lambda$ of the wave shape is a distance between the two consecutive grooves 55 or between the two ridges 56 formed adjoining a given groove 55. The amplitude A of the wave shape is a distance between a lowest point of a given groove 55 and a highest point of an adjoining ridge 56, measured along a thickness of the strip 1, i.e. measured along a direction 97, as shown in FIG. 5, perpendicular to the transverse direction 96 of the strip 1 and perpendicular to the longitudinal axis 99 of the strip 1.

As shown in FIGS. 7, 8, and 9 in embodiments of the strip 1, the first abutment surface 51a and the second abutment surface 52a both have corrugated profiles in form of the first wave shape and the second wave shape, respectively. Both the first and the second wave shapes extend or are oriented in the transverse direction 96 of the strip 1, i.e. direction of the strip that extends between the first and the second longitudinal edges 61, 62 of the strip 1 and is perpendicular to the longitudinal direction 99 of the strip 1. In an embodiment of the strip 1, as shown in FIGS. 7 and 8 the first and the second wave shapes are identical i.e. the amplitudes $A_1$ and $A_2$ are substantially the same and the wavelengths $\lambda_1$ and $\lambda_2$ are substantially the same. In an alternate embodiment of the strip 1, as shown in FIG. 9, the first and the second wave shapes are non-identical i.e. the first and the second wave shapes differ from each other in wavelength and/or amplitude (not shown in FIG. 9).

As shown in FIG. 10, in another embodiment of the strip 1, the first abutment surface 51a and the second abutment surface 52a have the corrugated profile, however, one or both of the abutment surfaces 51a, 52a include planar surfaces P in between two adjoining grooves 55. As shown in FIG. 11, in another embodiment of the strip 1, one from the first abutment surface 51a and the second abutment surface 52a has the corrugated profile and the other has a planar surface P and is thus without corrugated profile.

As shown in FIG. 17, in an embodiment of the strip 1, the first abutment surface 51a and/or the second abutment surface 52a having the corrugated profile also includes one or more trenches 58 formed therein. Although FIG. 17 depicts only one such trench 58, it is well within the scope of the present technique that a plurality of such trenches 58 are formed on the abutment surface 51a, 52a. Each of the trenches 58 extends between at least two adjacent grooves 55. The trenches 58 are pits, canals, channels, or valleys formed on the abutment surface 51a, 52a and that conduct or allow fluid flow, in particular resin flow, between the two adjacent grooves 55 so establishing fluid communication, i.e. being fluidly connected, between the adjacent grooves 55 i.e. the trench 58 allow or facilitate flow of resin between the two adjacent grooves 55. In a non-depicted embodiment, the trenches 58 extend perpendicular to the grooves 55.

FIG. 12 depicts yet another embodiment of the strip 1. In this embodiment the strip 1 includes a first peel-ply layer 36 on the first abutment surface 51a and/or a second peel-ply layer 38 on the second abutment surface 52a. The peel-ply layer 36,38 at least partially covers the abutment surface 51a, 52a on which the peel-ply layer 36,38 is present. The surface 37 of the peel ply layer 36,38 is flush with the surface of the peripheral region 51p, 52p of the sides 51, 52 of the strip 1.

FIGS. 13 to 16 show stacks 32 formed by placing the strip 1 on top of another strip 1. It may be noted that directional terminology, such as 'top', 'bottom', 'front', 'back' etc., is used in FIGS. 13 to 16 and in other accompanying FIGs of the present technique with reference to the orientation of the FIG(s) being described. The components of embodiments of the invention can be positioned in a number of different orientations. As such, the directional terminology is used for purposes of illustration and is in no way limiting. For example, the stacking of the strips 1 may be side by side instead of on top of one another. It may also be noted that although in the stacks 32 only two strips 1 are depicted in FIGS. 13 to 16, in general the number of strips 1 in the stacks 32 are greater, for example between four and twelve, or more. The number of strips 1 to be stacked in the stack 32 depends on numerous factors for example, thickness of the strips 1, desired thickness of the spar cap 30, etc. The stack 32 of FIG. 13 shows two identical strips 1 of FIG. 6 stacked. The stack 32 of FIG. 14 shows two identical strips 1 of FIGS. 5 and 7 stacked. The stack 32 of FIG. 15 shows two non-identical strips 1 stacked. The stack of FIG. 16 shows two identical strips 1 stacked but each of the stacked strip is has non-identical waveforms on its respective abutment surfaces 51a, 52a. As is depicted in FIGS. 13 to 16, as a result of the grooves 55 present on the abutment surfaces 51a, 52a, when the strips 1 are stacked, resin flow channels 59 are defined between the adjacent strips 1. The resin flow channels 59 include one or more of the grooves 55 of one or both of the adjacent strips 1. The resin flow channels 59 also extend longitudinally between the surfaces of the adjacent strips 1 and facilitate resin flow.

FIG. 18, in comparison with FIG. 3, depicts rotor blade 10 having spar caps 30 of the present technique. Instead of the conventional spar caps 230a, 230b, 230c, 230d are the spar caps 30a, 30b, 30c, 30d of the present technique. The spar cap 30 includes a plurality of strips 1 stacked with one or more similar strips 1. Each of the strips 1 is as described hereinabove with respect to FIGS. 5 to 12 and FIG. 17, and are stacked for example as described for FIGS. 13 to 16. The strips 1 are oriented such that one of the abutment surfaces 51a, 52a i.e. either the first or the second abutment surface 51a, 52a of the strip 1 faces one of the abutment surfaces 51a, 52a of an adjacent strip 1, i.e. faces either the first or the second abutment surface 51a, 52a of the adjacent strip 1. The first and the second sides 51, 52 are spaced apart in the flap-wise direction 9d. The first and the second edges 61, 62 are spaced apart in the chord-wise direction 17d. The first and the second sides 51, 52 and the first and the second edges 61, 62 of the strips 1 extend longitudinally along the span-wise direction 16d.

FIG. 19 depicts a flow chart showing the method 500 for making the spar cap 30, i.e. the one or more of the spar caps 30a, 30b, 30c, 30d, for the wind turbine rotor blade 10. In the method 500, in a step 510 a plurality of the strips 1 is provided. Each of the strips 1 is as described hereinabove in reference to FIGS. 5 to 12. The strips 1 are then stacked in a mould to form a stack of the strips. In the method 500, after the step 510 in a step 530, the strips 1 are stacked as described hereinabove in reference to FIGS. 13 to 16, thus defining the resin flow channels 59 in-between the stacked strips 1. After completion of this stage of the method 500, the mould has the stack 32 of the strips 1 and has components that are placed to form parts of the shell 21 of the blade 10. Thereafter, subsequent to the step 530 in the method 500, in a step 540 resin is supplied to the stack 32. The resin flow in the step 540 may be achieved by Vacuum Assisted Resin Transfer Molding (VARTM) process. Finally, in the method 500, in a step 550 the resin is cured to bond the adjacent strips 1 together.

An embodiment of the method 500, when the strips 1 used for the method 500 include the first and/or the second peel-ply layers 36, 38 as described hereinabove in reference to FIG. 17, includes a step 520 in which the first and/or the second peel plies 36, 38 are removed from their respective abutment surfaces 51a, 52a before the step 530 is performed.

It may be noted that the strips 1 of the present technique are used for the wind turbine blades 10 that have the so-called 'structural shell design' as shown in FIG. 18 in which the spar caps 30a, 30b, 30c, 30d are integrated within the structure of the outer shell 21. Furthermore, the number of spar caps 30a, 30b, 30c, 30d depicted in FIG. 18 are for exemplary purposed only, and it may be appreciated by one skilled in the art that the blade 10 of the present technique may have two spar caps 30 i.e. only one pair of the spar caps 30, or may have more than four spar caps 30, for example six spar caps 30 forming three distinct pairs of the spar caps 30.

It may further be noted that description of FIG. 3 and its comparison with FIG. 18 represents a 'butterfly blade' construction. However, the present technique is also applicable to the well-known 'integral blade' construction of Siemens, where unlike butterfly blade construction the leeward and windward shells are not separately manufactured. In the integral blade construction, the entire shell is manufactured in one-part as an integral shell and thus does not have a separately manufactured leeward and windward side.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A pultruded fibrous composite strip for stacking with one or more similar strips to form a spar cap of a wind turbine rotor blade, the pultruded fibrous composite strip comprising:

a substantially constant cross-section defined by a first longitudinally extending side that is mutually opposed by a second longitudinally extending side and by a first longitudinal edge and a second longitudinal edge, wherein the first longitudinally extending side and the second longitudinally extending side include a first abutment surface and a second abutment surface, respectively; and an interstitial space between the first abutment surface and the second abutment surface;

wherein, at least one of the first abutment surface and the second abutment surface has a corrugated profile such that a plurality of longitudinally extending grooves are defined on the first abutment surface and/or the second abutment surface;

wherein the corrugated profile is defined by a series of curved ridges adjacent to the plurality of longitudinally extending grooves such that an interstitial space is created between the pultruded fibrous composite strip and a neighboring strip, the interstitial space comprising the plurality of longitudinally extending grooves and a space between the pultruded fibrous composite strip and the neighboring strip that extends in a transverse direction to the pultruded fibrous composite strip and adjacent the plurality of longitudinally extending grooves;

wherein the first abutment surface and/or the second abutment surface having the corrugated profile comprises one or more trenches formed therein and extending between at least two adjacent longitudinally extending grooves of the plurality of longitudinally extending grooves, wherein the one or more trenches are configured to fluidly connect the two adjacent longitudinally extending grooves.

2. The pultruded fibrous composite strip according to claim 1, wherein the corrugated profile has a wave shape in a transverse direction extending between the first longitudinal edge and the second longitudinal edge, further wherein the transverse direction of the pultruded fibrous composite strip is perpendicular to a longitudinal direction of the pultruded fibrous composite strip.

3. The pultruded fibrous composite strip according to claim 2, wherein the wave shape is a symmetric waveform.

4. The pultruded fibrous composite strip according to claim 3, wherein the symmetric waveform is a sinusoidal waveform.

5. The pultruded fibrous composite strip according to claim 2, wherein an amplitude of the wave shape is between 100 μm and 1000 μm.

6. The pultruded fibrous composite strip according to claim 2, wherein a wavelength of the wave shape is between 2 mm and 50 mm.

7. The pultruded fibrous composite strip according to claim 1, wherein the first abutment surface and the second abutment surface both have corrugated profiles having a first wave shape and a second wave shape, respectively, in a transverse direction extending between the first longitudinal edge and the second longitudinal edge and wherein the transverse direction of the pultruded fibrous composite strip is perpendicular to a longitudinal direction of the pultruded fibrous composite strip, further wherein the first wave shape and the second wave shape are identical.

8. The pultruded fibrous composite strip according to claim 1, wherein the first abutment surface and the second abutment surface both have corrugated profiles having a first wave shape and a second wave shape, respectively, in a transverse direction extending between the first longitudinal edge and the second longitudinal edge and wherein the transverse direction of the pultruded fibrous composite strip is perpendicular to a longitudinal direction of the pultruded fibrous composite strip, further wherein the first wave shape and the second wave shape differ in amplitude and/or wavelength.

9. The pultruded fibrous composite strip according to claim 1, wherein one of the first abutment surface and the second abutment surface has the corrugated profile and other of the first abutment surface and the second abutment surface has a planar surface.

10. The pultruded fibrous composite strip of claim 1, further comprising a first peel-ply layer and/or a second peel-ply layer, respectively, at least partially covering the first abutment surface and/or the second abutment surface having the corrugated profile, wherein a surface of the first peel-ply layer and/or a surface of the second peel-ply layer is flush with the first abutment surface and the second abutment surface, respectively.

11. A spar cap for a wind turbine rotor blade, the spar cap comprising a plurality of pultruded fibrous composite strips stacked with one or more similar strips to form a stack of pultruded fibrous composite strips, wherein each pultruded fibrous composite strip comprises a substantially constant cross-section defined by a first longitudinally extending side that is mutually opposed by a second longitudinally extending side and by a first longitudinal edge and a second longitudinal edge, wherein the first longitudinally extending side and the second longitudinally extending side include a first abutment surface and a second abutment surface, respectively, wherein, at least one of the first abutment surface and the second abutment surface has a corrugated profile such that a plurality of longitudinally extending grooves are defined on the first abutment surface and/or the second abutment surface, wherein the corrugated profile is defined by a series of curved ridges adjacent to the plurality of longitudinally extending grooves, wherein the first abutment surface and/or the second abutment surface having the corrugated profile comprises one or more trenches formed therein and extending between at least two adjacent longitudinally extending grooves of the plurality of longitudinally extending grooves, wherein the one or more trenches are configured to fluidly connect the two adjacent longitudinally extending grooves, and an interstitial space between the plurality of pultruded fibrous composite strips, the interstitial space comprising the plurality of longitudinally extending grooves and a space between the plurality of pultruded fibrous composite strips in a transverse direction to each strip and adjacent the plurality of longitudinally extending grooves;

wherein the stack of the plurality of pultruded fibrous composite strips are oriented such that one of the first abutment surface and the second abutment surface of one of the plurality of pultruded fibrous composite strips of the stack faces abutment surfaces of an adjacent strip of the stack.

12. A wind turbine rotor blade having a spar cap according to claim 11.

13. The spar cap of claim 11, wherein each pultruded fibrous composite strip further comprises a first peel-ply layer and/or a second peel-ply layer, respectively, at least partially covering the first abutment surface and/or the second abutment surface having the corrugated profile, wherein a surface of the first peel-ply layer and/or a surface of the second peel-ply layer is flush with the first abutment surface and the second abutment surface, respectively.

14. A method for making a spar cap for a wind turbine rotor blade, the method comprising:

providing a plurality of pultruded fibrous composite strips, wherein each pultruded fibrous composite strip comprises a substantially constant cross-section defined by a first longitudinally extending side that is mutually opposed by a second longitudinally extending side and by a first longitudinal edge and a second longitudinal edge, wherein the first longitudinally extending side and the second longitudinally extending side include a first abutment surface and a second abutment surface, respectively, wherein, at least one of the first abutment surface and the second abutment surface has a corrugated profile such that a plurality of longitudinally extending grooves are defined on the first abutment surface and/or the second abutment surface, wherein the corrugated profile is defined by a series of curved ridges adjacent to the plurality of longitudinally extending grooves, wherein the corrugated profile is defined by a series of curved ridges adjacent to the plurality of longitudinally extending grooves such that an interstitial space is created between each pultruded fibrous composite strip and a neighboring strip, the interstitial space comprising the plurality of longitudinally extending grooves and a space between each pultruded fibrous composite strip and the neighboring strip that extends in a transverse direction to each pultruded fibrous composite strip and adjacent the plurality of longitudinally extending grooves, wherein the first abutment surface and/or the second abutment surface having the corrugated profile comprises one or more trenches formed therein and extending between at least two adjacent longitudinally extending grooves of the plurality of longitudinally extending grooves, wherein the one or more trenches are configured to fluidly connect the two adjacent longitudinally extending grooves;

stacking the plurality of pultruded fibrous composite strips in a mould to form a stack of pultruded fibrous composite strips such that, in the stack, one of the first abutment surface and the second abutment surface of one of the plurality of pultruded fibrous composite strips of the stack faces abutment surfaces of an adjacent strip of the stack to define longitudinally extending resin flow channels therebetween, wherein each of the resin flow channels comprises at least one of the plurality of longitudinally extending grooves defined on one of the first abutment surface and the second abutment surface facing each other in the stack;

supplying resin to the stack and causing the resin to infiltrate into the longitudinally extending resin flow channels; and curing the resin to bond adjacent strips together.

15. The method according to claim 14, further comprising removing the first and/or the second peel plies before stacking the plurality of pultruded fibrous composite strips in the mould to form the stack.

16. The method of claim 14, wherein each pultruded fibrous composite strip further comprises a first peel-ply layer and/or a second peel-ply layer, respectively, at least partially covering the first abutment surface and/or the second abutment surface having the corrugated profile, wherein a surface of the first peel-ply layer and/or a surface of the second peel-ply layer is flush with the first abutment surface and the second abutment surface, respectively.

* * * * *